J. HUTCHINGS.
FUEL FEEDING AND REGULATING APPARATUS.
APPLICATION FILED NOV. 21, 1908.

944,868.

Patented Dec. 28, 1909.
7 SHEETS—SHEET 1.

FIG. I.

Witnesses:

Inventor
John Hutchings
By
James L. Norris
Atty.

J. HUTCHINGS.
FUEL FEEDING AND REGULATING APPARATUS.
APPLICATION FILED NOV. 21, 1908.

944,868.

Patented Dec. 28, 1909.
7 SHEETS—SHEET 5.

J. HUTCHINGS.
FUEL FEEDING AND REGULATING APPARATUS.
APPLICATION FILED NOV. 21, 1908.

944,868.

Patented Dec. 28, 1909.
7 SHEETS—SHEET 6.

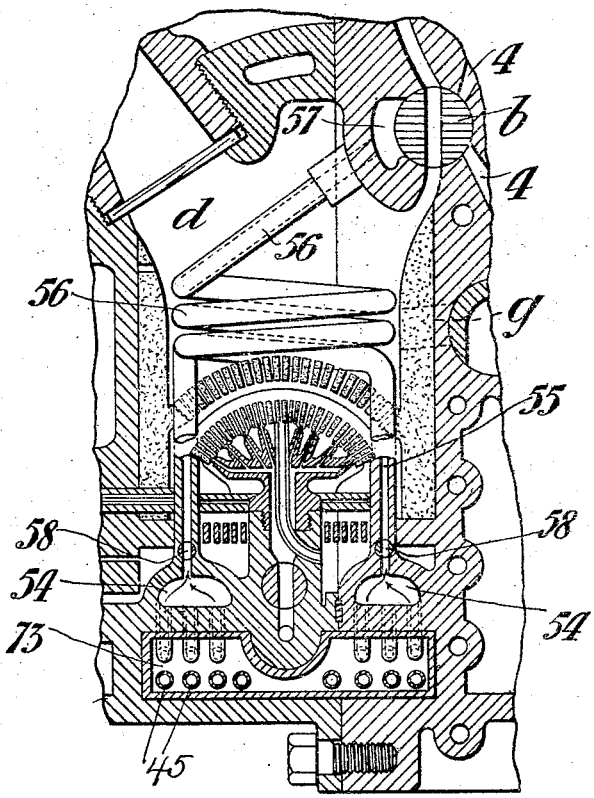

UNITED STATES PATENT OFFICE.

JOHN HUTCHINGS, OF LONDON, ENGLAND.

FUEL FEEDING AND REGULATING APPARATUS.

944,868.      Specification of Letters Patent.      Patented Dec. 28, 1909.

Application filed November 21, 1908. Serial No. 463,837.

*To all whom it may concern:*

Be it known that I, JOHN HUTCHINGS, a subject of the King of Great Britain, residing at Capel House, 62 New Broad street, in the city of London, England, have invented certain new and useful Improvements in Fuel Feeding and Regulating Apparatus, of which the following is a specification.

This invention relates to an improved apparatus for supplying combustible fluid under constant pressure to turbines or rotors and internal combustion engines and the like, wherein a hydrocarbon in admixture with air is exploded or combined within a combustion chamber.

Figure 1:
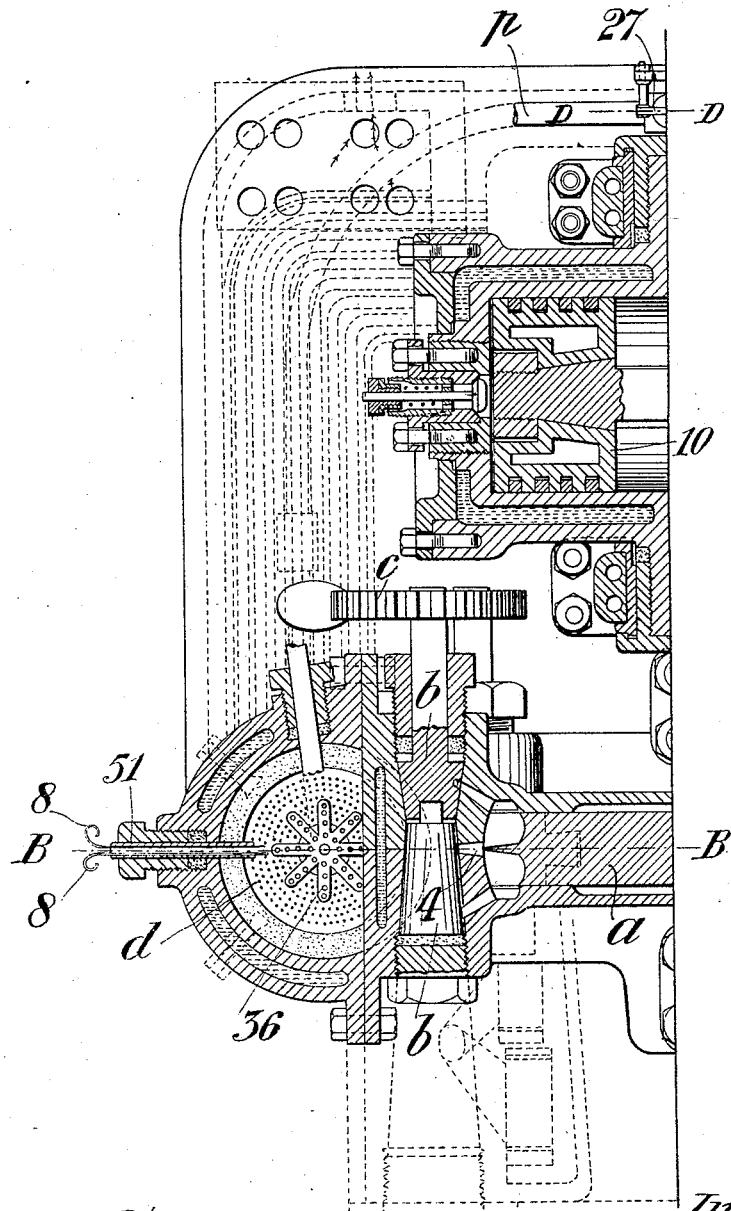
Figure 2:
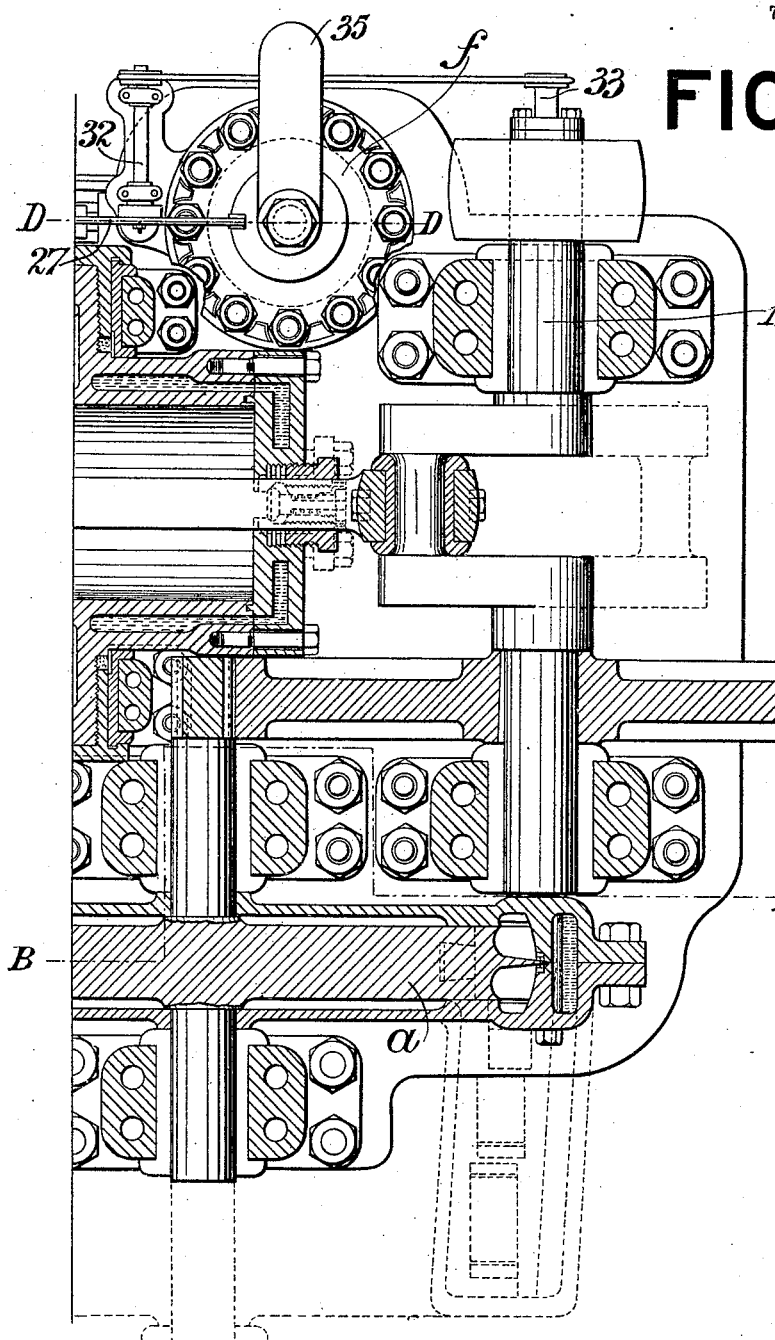
Figure 3:
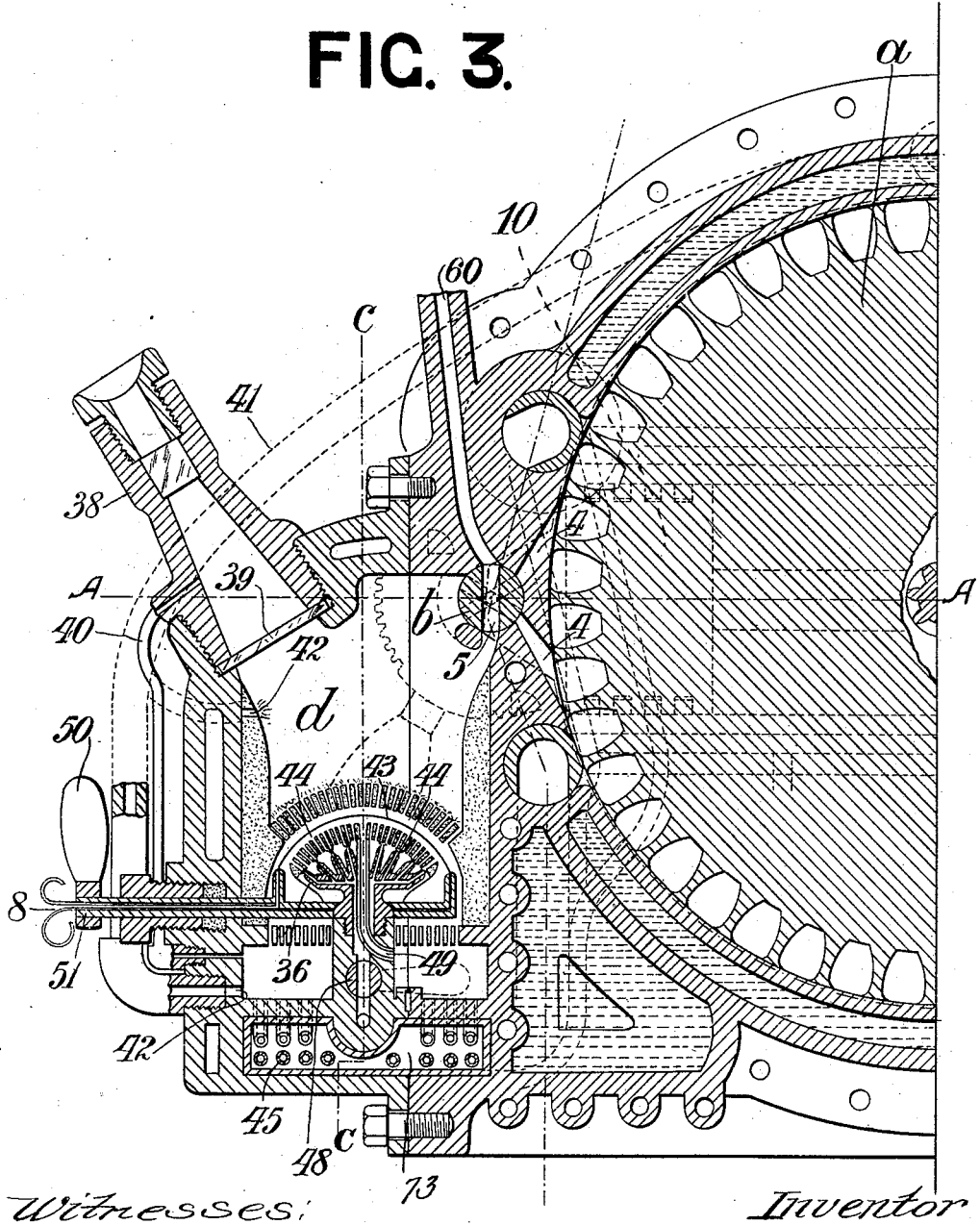
Figure 4:
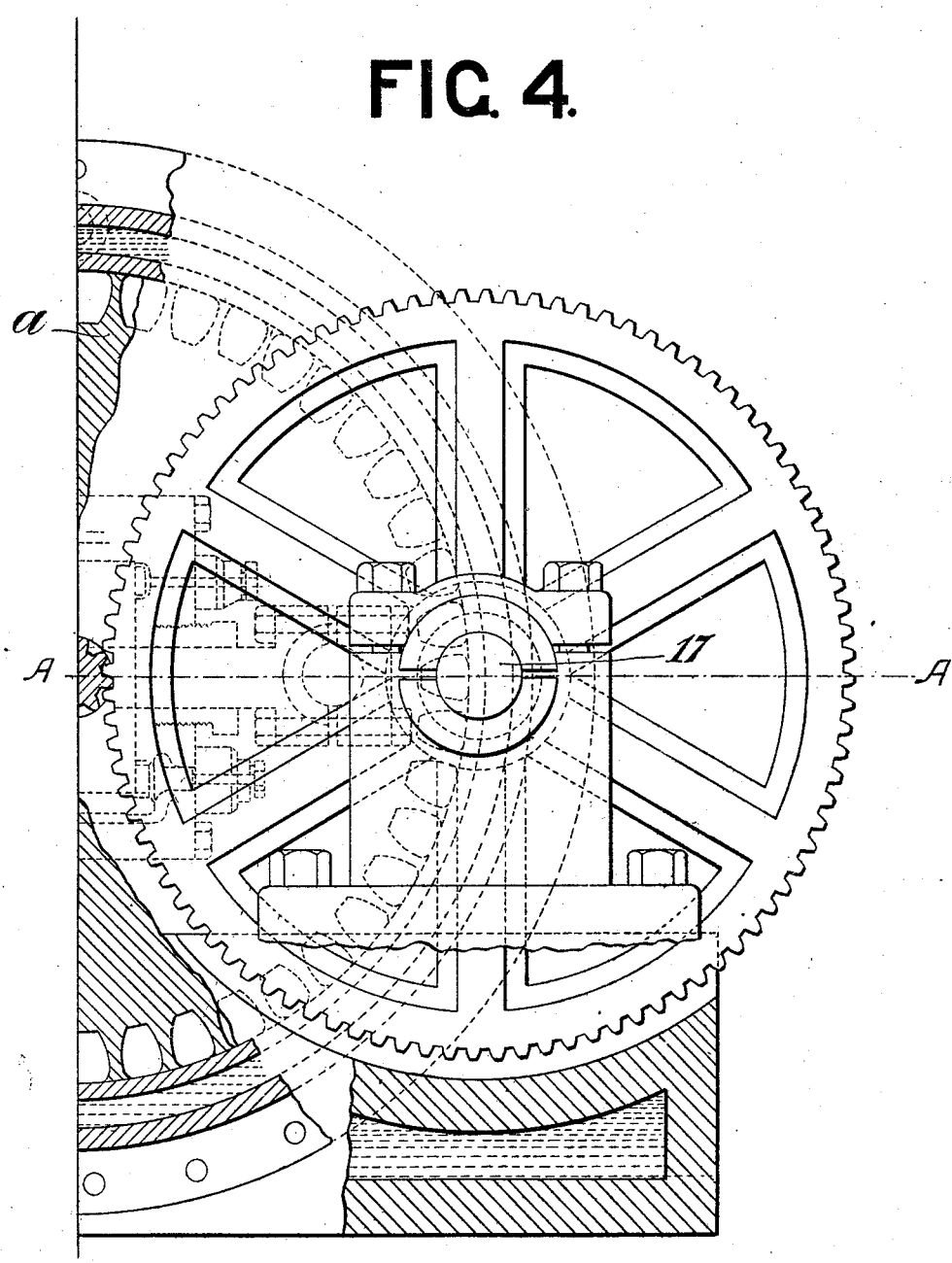
Figure 5:
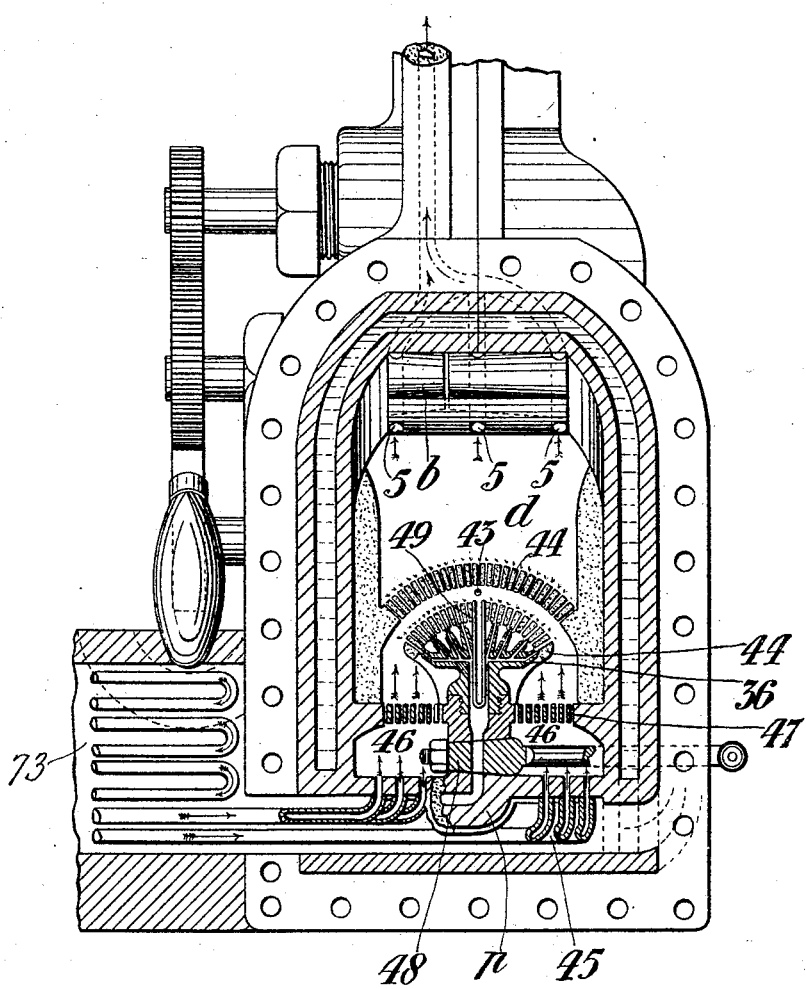
Figure 6:
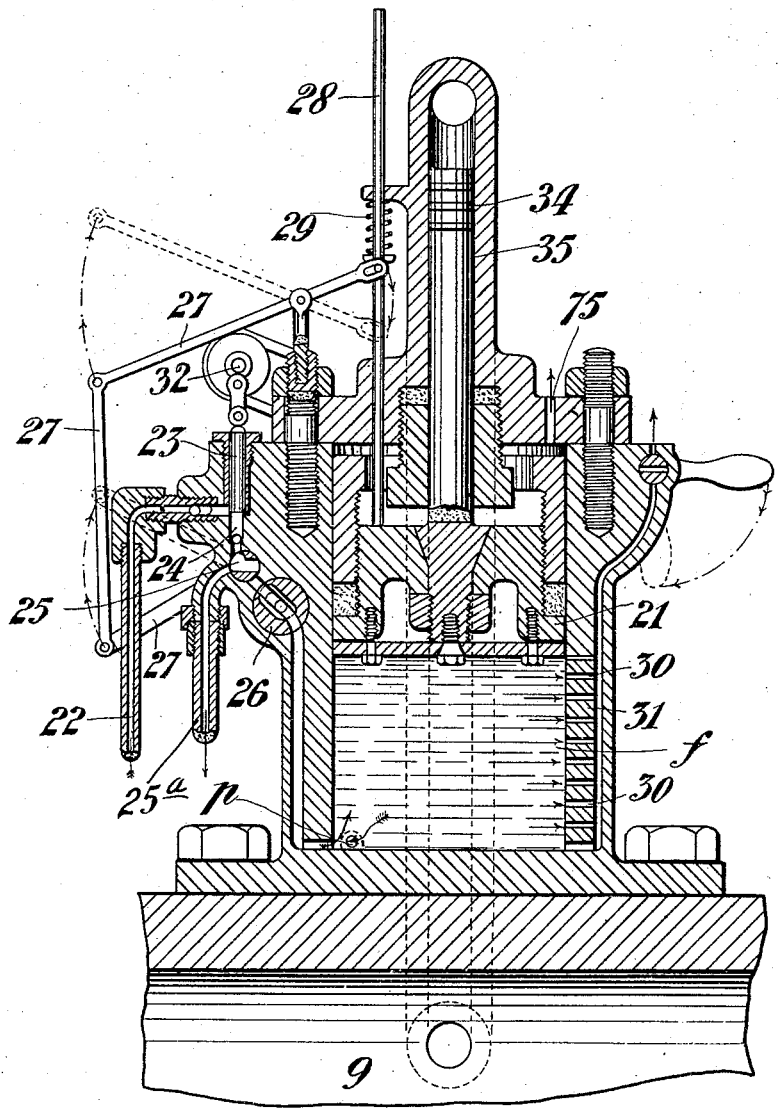

In the drawings accompanying this specification:—Figures 1 and 2 show respectively the left hand and right hand half part plan views partly in section, the section being taken on the line A, A, Figs. 3 and 4; Figs. 3 and 4 are the left hand and right hand half portion respectively of a side elevation partly in section, the section being taken on the line B, B, Figs. 1 and 2; Fig. 5, is a sectional view of the combustion chamber taken on the line C, C, Fig. 3; Fig. 6, is a similar section to the preceding figure of the hydro-carbon supply chamber and its mechanism the section being taken on the line D, D, Fig. 2; Fig. 7, shows a sectional elevation of a portion of Fig. 2, being the parts adjacent to the combustion chamber, and modified so as to heat the air separately from the gases to support combustion.

Motive fluid is produced within a chamber *d*, Figs. 1, 3 and 5 by the combustion of a gas, hydrocarbon or other combustible matter in combination with regulated quantities of air or its equivalent, such as oxygen, and the products of combustion are thence conveyed through one or more suitable channels 5, 5, regulated by valve apparatus *b*, *c*, automatically or otherwise actuated. The valves of this apparatus, both inlet and exhaust, are shown for simplicity hand operated and geared together. The ignition is attained by usual electrical or other means.

Upon first igniting an explosive mixture in the chamber *d* and prior to the opening up of free communication to say the turbine (an application to which I have chosen to illustrate my improved apparatus) the passage 60 is left open by appropriately positioning the valve *b*, so that the products of combustion are free to pass to the atmosphere. 8 indicates the situation of an ignition device consisting of a wire 43 capable of incandescence under the action of electrical energy. The wire 43 can be turned by the handle 50 on the axle 51 out of position when not required for sparking. The air supply to support the combination, or combustion, within the said chamber *d* is received from a vessel, or first receiver 9, into which air is forced under high pressure by a compression pump, the piston 10 (or it may be pistons) of which is shown as double acting for economy and uniformity in the supply. The combustible fluid is supplied from a reservoir *f* suitably positioned, here shown at Fig. 6 in section, and the pressure therein maintained to prevent backflow may be attained by any suitable means such for instance as by a pressure pump or the like acting on a piston or diaphragm interposed between the fluid developing the pressure on the oil or combustion maintaining liquid and said liquid itself. A non-return valve between the combustion chamber and the oil reservoir prevents any back flow. I have chosen as an illustration a double ended piston whose larger end 21 reciprocates in a corresponding cylinder as *f*, said cylinder having its supply derived from any suitable source by way of a passage 22 leading to a force pump 23, actuated by a cranked axle on a belt-driven shaft 32, or similar device. This shaft 32 is driven by the shaft 17 by means of a pulley 33 driving said belt. This pump 23 forces in the oil by the passage 24 past a regulating valve 25 and a stop cock 26 leading into the said reservoir *f*. This flow of oil under pressure is regulated by the valve 25 through connections 27, 27 linked to a rod 28 pressing on the piston 21 and sliding in a bearing in the cover thereof, so that each reciprocation of this piston is conveyed to the valve 25, and a spring 29 assists the motion of the rod 28 and keeps it in touch with this piston.

25$^a$ represents an outlet which leads from the passage connecting the force pump with the reservoir, this outlet being under the control of the valve 25 so that after the reservoir has received a predetermined amount of fluid, a turning of the valve 25 through the medium of the mechanism previously described will cause the supply of fluid to the reservoir to be interrupted whereupon the fluid from the pump will pass into the outlet.

To avoid any tendency of the air above or in rear of the piston 21 to cushion or impede the movements of said piston a duct 75 open to the atmosphere is provided. Openings 30 in the wall of the reservoir cylinder $f$ admit of the outflow of any air or oxygen that may accumulate under the piston 21 and these openings lead to an outlet passage 31.

From cylinder $f$ oil is forced through the pipe $p$ to the burners 36, 36, supplying the hood. The small end of the double piston device reciprocates in a chamber 35 which forms its cylinder, which cylinder 35 is in communication with the compressed air reservoir 9. This lesser piston, is as regards the area of its operative face, somewhat in excess of the combined areas of all the jets 36 supplied by the hydrocarbon reservoir so that by this excess of area of the piston 34 a slight pressure (due to the compressed air acting on its face) over and above the pressure existing in the chamber $d$ is maintained upon the combustible fluid through the medium of the piston 21 and thereby back flow is prevented, reinforcing the forward flow of the hydrocarbon and tending to insure constant supply.

Referring to Fig. 7, in this arrangement the compressed air from the reservoir 9 is by means of pipes 45 (carried through the exhaust chamber 73) led into chambers 54 and thence by other pipes 55 into a coil of piping 56 whence the highly heated air is delivered into the inlet valve antechamber 57 from which it is delivered into one or other of a pair of passages 4, 4, oppositely inclined by which the air is propelled into the vanes of the turbine the selection of direction of delivery being determined by the valve $b$. When this arrangement is employed the products of combustion are led directly into the exhaust passage $g$ shown in dotted lines.

Such quantity of air as is needed to effect combination or support combustion in the chamber $d$ is supplied through the passages 55, 55, controlled by valves 58 therein, the products of combustion, or highly heated gases, instead of being conducted directly on to say the turbine $a$, or it may be the reaction wheel, to impart motion thereto, may be conducted to and around pipes 56, 56, as in Fig. 7 (or it may be pipes and vessels) through which air is caused to pass under pressure and the surrounding heating products of combustion will by imparting their heat to these pipes 56 and to the included air, bring about expansion and enhanced pressure to the jets of motor fluid delivered on to the vanes or buckets of the wheel. In this case the products of combustion pass away through openings $g$ one of which is shown by dotted lines, into the exhaust passage 52.

Means for visual examination of the internal combustion chamber may be provided by a spy tube and lens, as at 38, but this will be well understood. A convenient arrangement is shown in which 39 is a diaphragm of incombustible material of translucent character and to equalize pressure on each side thereof a small communication is made from the inner to the outer face of the diaphragm by way of the channel 40.

In some cases I provide a means of modifying the temperature and pressure within the combustion chamber by a controlled inlet for steam or water vapor or spray, and such an inlet pipe 41 having delivery jets 42, 42, one above and one below the level of the burners 36 is shown in Fig. 3.

The air, and fluid of highly combustible character are delivered, in accurately proportioned quantities, within a reticulate or other surface permeable to the mixed air and gases or vapors, but not to the flame which is confined to the outer surface of the mantle and effect combustion externally of this surface; or the said fluid may be delivered within the permeable mantle or reticulate surface and the air to support combustion may be independently supplied around said outer surface, with the consequent effect that the mantle or permeable surface becomes highly heated or glows into incandescence or produces a white flare. In Figs. 3 and 5 are shown such a device wherein an ignition wire 43 is located in the chamber formed between the upper and lower surfaces of the "hood" or "mantle" 44, through the orifices in which the combined air and gas under pressure escapes into chamber $d$. The air to the mantle 44 enters the pipes 45 and traverses the coils thereof absorbing heat imparted to them by the escaping products of combustion in the exhaust chamber 73 surrounding them and therefrom the air expands into the chamber 46 and thence passes through the perforated plate 47 which serves to divide the flow and equalize distribution of the air to the point of delivery of the gas entering by the jets 36. The supply of gas is controlled by the stop cock 48 and the air is similarly controlled by another stop cock (not shown). To insure equalized admixture of the component gas and air forming the combustible medium, a subsidiary air inlet 49 is provided see Figs. 3 and 5, this inlet leading into the space within the mantle and supplied from the chamber into which the pipes 41 and 45 deliver. The upper end of the pipe 49 is in some cases extended upward so that it contacts with the wire 43 when that wire is swung to its full extent and when the wire 43 is rocked away again for a slight distance the arc is struck and ignition follows. The wire having performed this duty is then further swung on its bearings out of injurious reach of the intense heat of the burners.

One permeable chamber or reticulate hood within another similar chamber or hood delivering the gases and air into separate hoods or chambers and effecting combustion of the mixture externally of the outer hood or permeable chamber has many advantages but I do not confine myself to the particular arrangement shown.

Having now particularly described and ascertained the nature of my said invention, and in what manner the same is to be performed, I declare that what I claim is:—

1. A feeding and regulating apparatus for combustible fluids comprising a reservoir to contain the combustible fluid, a combustion chamber to receive such fluid, means for supplying compressed air to said combustion chamber, means operative by the pressure of said compressed air for producing a pressure upon the combustible fluid contained in said reservoir, a force pump normally acting to supply combustible fluid to said reservoir and having a passage leading to the latter which passage is provided with an outlet, and means controlled by the quantity of combustible fluid in said reservoir for regulating the flow of such fluid into the reservoir and for directing the fluid from said pump into said outlet after the reservoir receives a predetermined quantity of fluid.

2. A feeding and regulating device for combustible fluids comprising a reservoir to contain a combustible fluid, a combustion chamber connected to receive combustible fluid from said reservoir, a source of compressed air connected to said combustion chamber, and means acted on by compressed air from said source to produce a pressure upon said combustible fluid to force it into the combustion chamber, the said means being capable of producing a pressure upon the combustible fluid which is in excess of the pressure of compressed air in the combustion chamber, a continuously operating force pump for supplying combustible fluid to said reservoir and a valve controlled by said means for interrupting the flow of combustible fluid to said reservoir after the latter has received a predetermined amount of such fluid.

3. A device of the class described comprising a reservoir to contain a combustible fluid, a combustion chamber connected to receive such fluid, means for supplying compressed air to said combustion chamber, a device acted on by said compressed air for producing a pressure upon the combustible fluid sufficient to overcome the air pressure in said combustion chamber, a continuously operating force pump for supplying combustible fluid to said reservoir, and means controlled by the amount of combustible fluid in said reservoir for regulating the admission of combustible fluid to said reservoir from said pump.

4. A hydro-carbon fuel controlling device comprising a cylindrical reservoir for hydro-carbon fluid, a combustion chamber connected to receive hydrocarbon fluid from said reservoir, means connected to supply compressed air to said combustion chamber, a piston movable in said reservoir, a smaller piston fixed to said main piston and mounted in a separate cylinder, said smaller piston being subject to the pressure of said compressed air, means for forcing hydro-carbon fluid into said reservoir, a regulating valve for controlling the flow of said fluid, and means actuated by the movable piston for operating said valve.

5. A hydro-carbon fuel controlling device comprising a combustion chamber, a cylindrical reservoir for hydro-carbon fluid, said reservoir communicating with the combustion chamber, a main piston movable in said reservoir, a smaller piston fixed to said main piston and movable in a separate cylinder, a source of compressed air communicating with the combustion chamber and with the cylinder containing the smaller piston, a pump for forcing hydro-carbon fluid into said reservoir, a regulating valve, for controlling the flow of said fluid into said reservoir, a rod slidable in supports and bearing against said main piston and movable therewith, and a lever mechanism connecting said rod to the regulating valve.

In testimony whereof I have hereunto set my hand in presence of two subscribing witnesses.

JOHN HUTCHINGS.

Witnesses:
 JOHN COODE NORE,
 G. F. WARREN.